US006533228B1

(12) United States Patent
Yu

(10) Patent No.: US 6,533,228 B1
(45) Date of Patent: Mar. 18, 2003

(54) GUITAR STAND

(76) Inventor: Ming-Ti Yu, 122-5, Jun Liao Rd., Feng Yuan, Taichung Hsien (TW)

(*) Notice: Subject to any disclaimer, the term of this patent is extended or adjusted under 35 U.S.C. 154(b) by 0 days.

(21) Appl. No.: 10/251,865

(22) Filed: Sep. 17, 2002

(51) Int. Cl.[7] .................. F16M 11/38

(52) U.S. Cl. .................. 248/166; 248/434; 84/327

(58) Field of Search .................. 248/163.1, 176.1, 248/164, 166, 167, 165, 168, 188.6, 443, 434; 84/327; 403/87

(56) References Cited

U.S. PATENT DOCUMENTS

| | | | | | |
|---|---|---|---|---|---|
| 5,383,634 | A | * | 1/1995 | Liao | 248/166 |
| 5,505,413 | A | * | 4/1996 | Hennessey | 248/166 |
| 5,713,547 | A | * | 2/1998 | Yu | 248/166 |
| 5,836,552 | A | * | 11/1998 | Yu | 248/166 |
| 5,957,417 | A | * | 9/1999 | Yu | 248/166 |
| 6,113,040 | A | * | 9/2000 | Yu | 248/166 |
| 6,209,829 | B1 | * | 4/2001 | Yu | 248/122.1 |
| 6,412,742 | B1 | * | 7/2002 | Yu | 248/434 |

* cited by examiner

*Primary Examiner*—Anita King
*Assistant Examiner*—Gwendolyn Baxter

(57) ABSTRACT

A guitar stand has a main support frame, a first hollow leg, a second hollow leg, a first bracket, a second bracket, an adjustment seat, and a head block. The first bracket has a connector disposed on the first hollow leg. The second bracket has a connecting brace disposed on the second hollow leg. The head block has a pair of side pillars to receive a pair of cushions, a lower tube and a pair of lugs disposed on a lower portion of the lower tube. The adjustment seat is connected to the head block, the first hollow leg, and the second hollow leg. The main support frame has a main hollow rod, a three-way joint, a first support rod, and a second support rod. The three-way joint has an upper tube to receive the main hollow rod and a hollow socket connected to the upper tube. The hollow socket receives the first support rod and the second support rod.

4 Claims, 8 Drawing Sheets

GUITAR STAND

BACKGROUND OF THE INVENTION

The present invention relates to a guitar stand. More particularly, the present invention relates to a guitar stand which stands stably.

Referring to FIGS. 9 and 10, a guitar stand has a main hollow rod 10', a first hollow leg 30', a second hollow leg 40', a first brace 50', a second brace 60', a first bracket 70', and a second bracket 80'. A pivot means 20' fastens the first hollow leg 30' and the second hollow leg 40' on the main hollow rod 10' pivotally. A hollow upper block 11' is disposed on top of the main hollow rod 10'. The pivot means 20' has a lobe 21', a transverse plate 22' and a longitudinal plate 23' which is disposed on top of the transverse plate 22'. A main hollow rod 10' has a lobe 21' disposed on an upper portion of the main hollow rod 10'. A circular hole 211' and a curved hole 212' are formed on the main hollow rod 10'. A hollow upper block 11' has a lower protrusion 112' inserted in an upper end of the main hollow rod 10'. A first and a second round cushions 12' are disposed adjacent to a first and a second sides of the hollow upper block 11', respectively. The first round cushion 12' has a first center hole 121'. The second round cushion 12' has a second center hole 121'. A first bolt 111' passes through the first center hole 121' to fasten the first round cushion 12' on the hollow upper block 11'. A second bolt 111' passes through the second center hole 121' to fasten the second round cushion 12' on the hollow upper block 11'. A longitudinal plate 23' is disposed on a top of the transverse plate 22'. The longitudinal plate 23' has an upper hole to match the corresponding circular hole 211' and a lower hole to match the corresponding curved hole 212'. A first fastening member passes through the circular hole 211' and the upper hole and a second fastening member passes through the lower hole and the curved-hole 212' to fasten the lobe 21' and the longitudinal plate 23' together. A first and a second joints 31' are disposed on the first and the second hollow legs 40', respectively. Each of the first and the second joints 31' has a threaded lower portion 314' inserted in a top interior of the corresponding hollow leg 30' or 40', and a top recess 312' to receive the transverse plate 22'. A notch 301' is formed on a top rim of the first hollow leg 30'. A third and a fourth fastening members fasten the first and the second joints 31' on the transverse plate 22'. The first brace 50' is fastened on a lower portion of the first hollow leg 30'. The second brace 60' is fastened on a lower portion of the second hollow leg 40'. A first hook 71' extends from a top end of the first bracket 70' to be inserted in the first brace 50'. A second hook 81' extends from a top end of the second bracket 80' to be inserted in the second brace 60'. However, the hollow leg will be detached from the corresponding joint if the user extends the hollow leg to the utmost.

SUMMARY OF THE INVENTION

An object of the present invention is to provide a guitar stand which can stand stably.

Yet another object of the present invention is to provide a guitar stand which can be folded easily.

Accordingly, a guitar stand comprises a main support frame, a first hollow leg, a second hollow leg, a first bracket, a second bracket, an adjustment seat, and a head block. The first bracket has a connector disposed on the first hollow leg. The second bracket has a connecting brace disposed on the second hollow leg. The head block has a pair of side pillars to receive a pair of cushions, a lower tube and a pair of lugs disposed on a lower portion of the lower tube. Each of the lugs has a threaded aperture. The main support frame has a main hollow rod, a three-way joint, a first support rod, and a second support rod. The three-way joint has an upper tube to receive the main hollow rod and a hollow socket connected to the upper tube. The hollow socket has a first through hole, a second through hole, a recess chamber having a first slant wall and a second slant wall, and a pair of lower blocking bars. The recess chamber receives the first support rod and the second support rod. The lower blocking bars block and separate the first support rod and the second support rod. The adjustment seat has a hollow receptacle, a rib extending upward from the hollow receptacle, and a positioning panel disposed on the rib and the hollow receptacle. The hollow receptacle has a first through aperture, a second through aperture, a blind chamber having a first inner bevel and a second inner bevel, and a pair of lower blocking plates. The blind chamber receives the first hollow leg and the second hollow leg. The lower blocking plates block and separate the first hollow leg and the second hollow leg. The rib has a threaded hole. A bolt fastens the rib between the lugs.

DETAILED DESCRIPTION OF THE INVENTION

Figure 1:
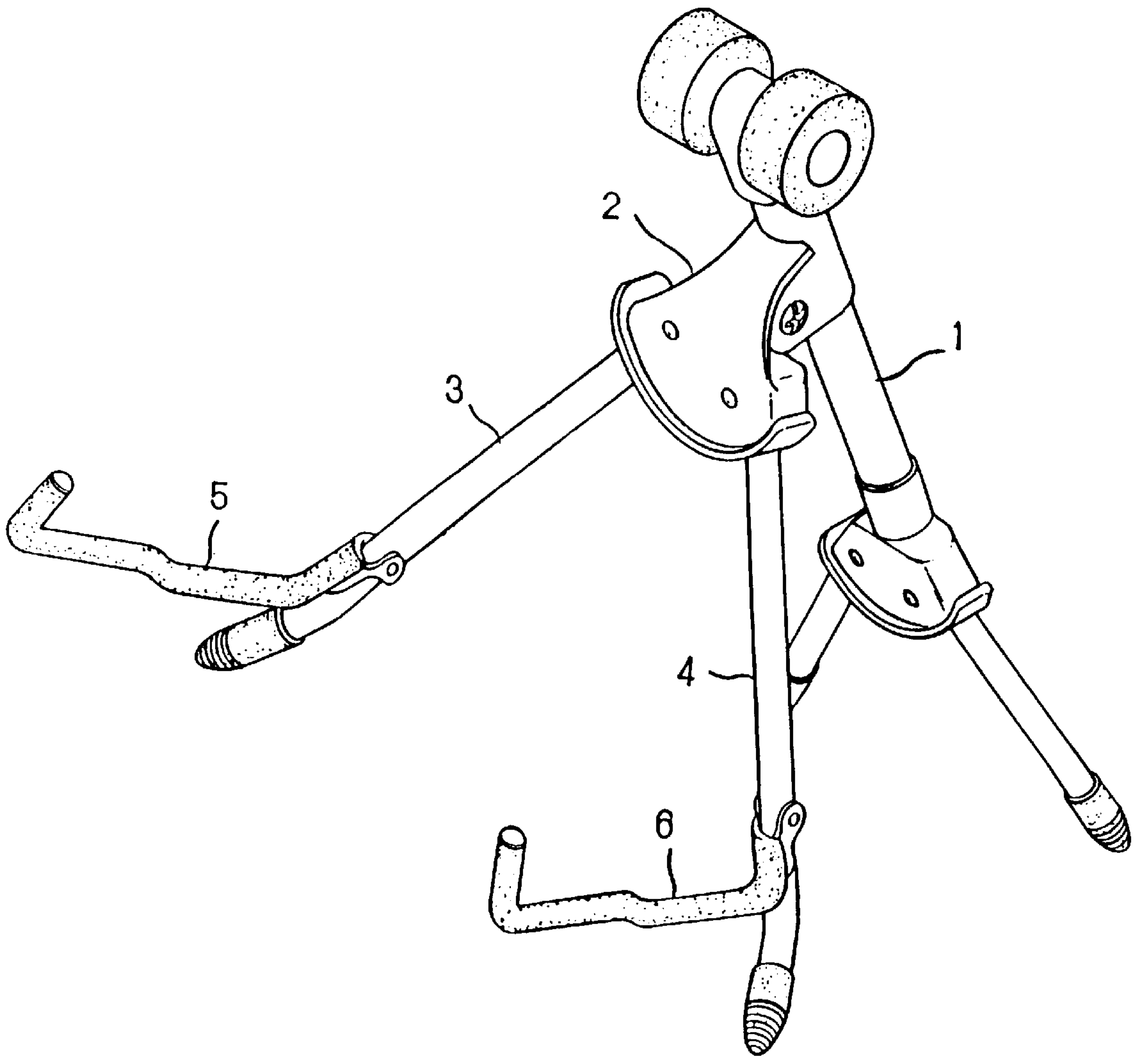
FIG. 1 is a perspective assembly view of a guitar stand of a preferred embodiment in accordance with the present invention.
Figure 2:
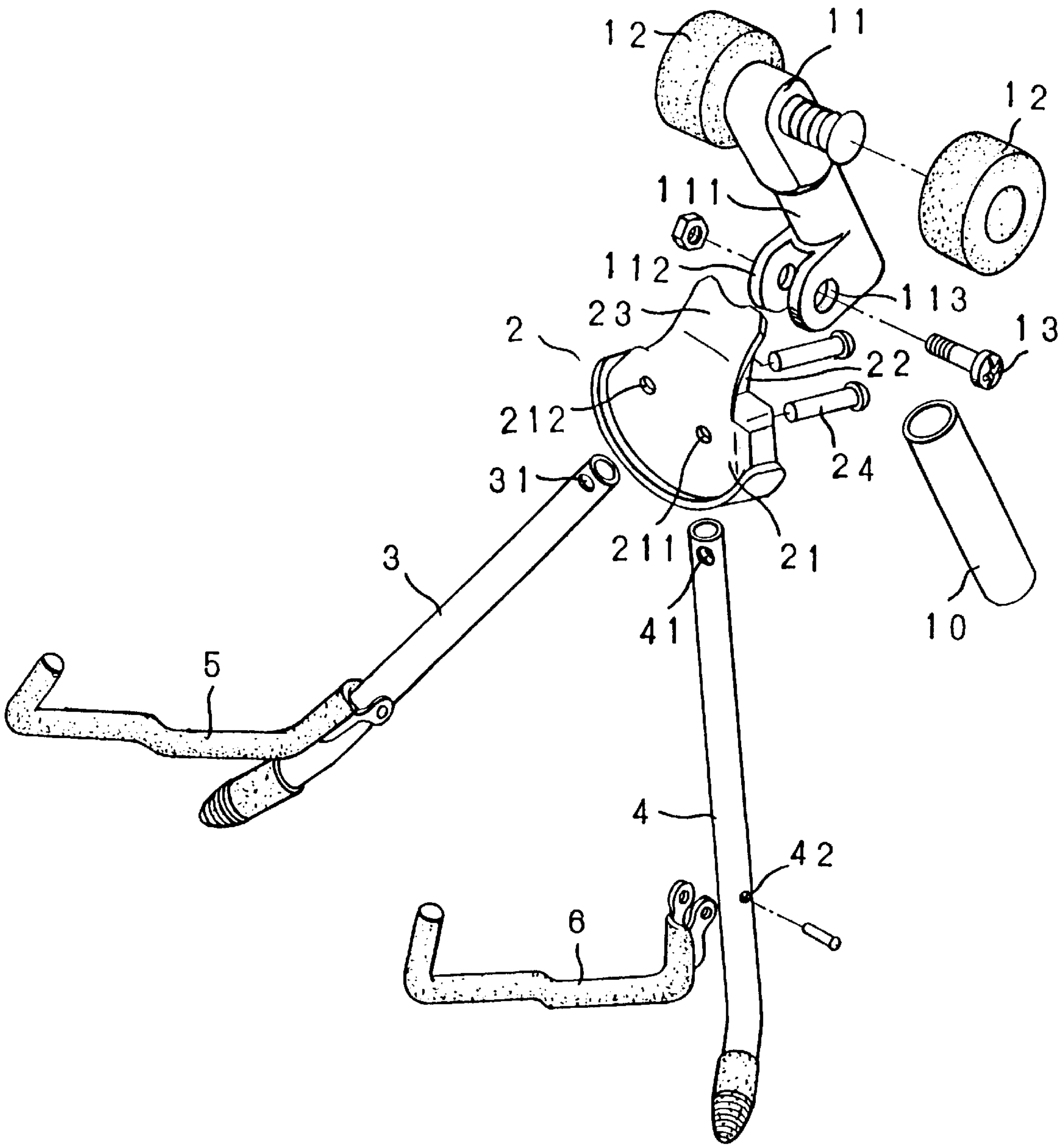
FIG. 2 is a partially perspective exploded view of a guitar stand of a preferred embodiment in accordance with the present invention.
Figure 3:
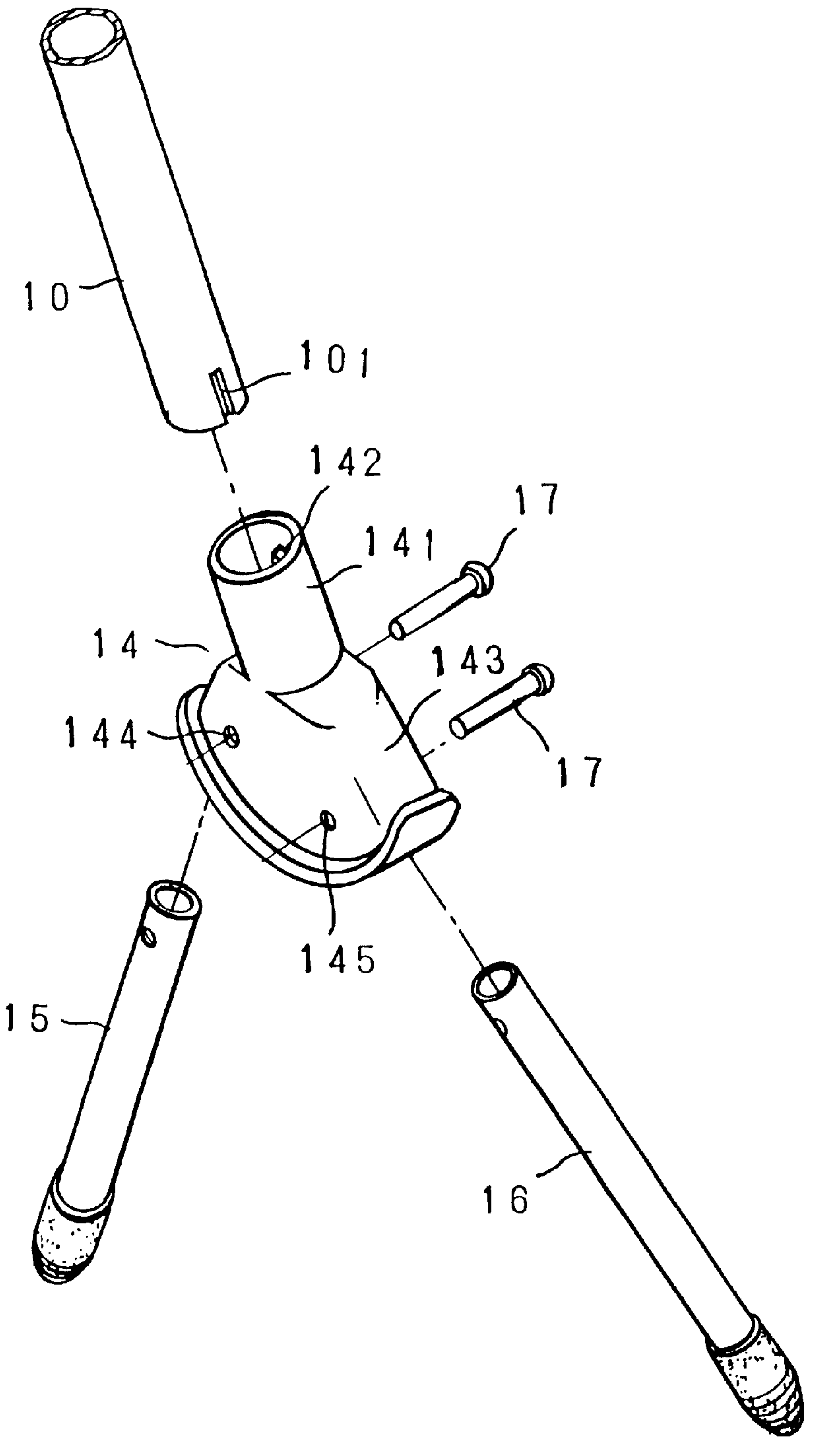
FIG. 3 is a perspective exploded view of a three-way joint, a main hollow rod, a first support rod and a second support rod of a preferred embodiment in accordance with the present invention.
Figure 4:
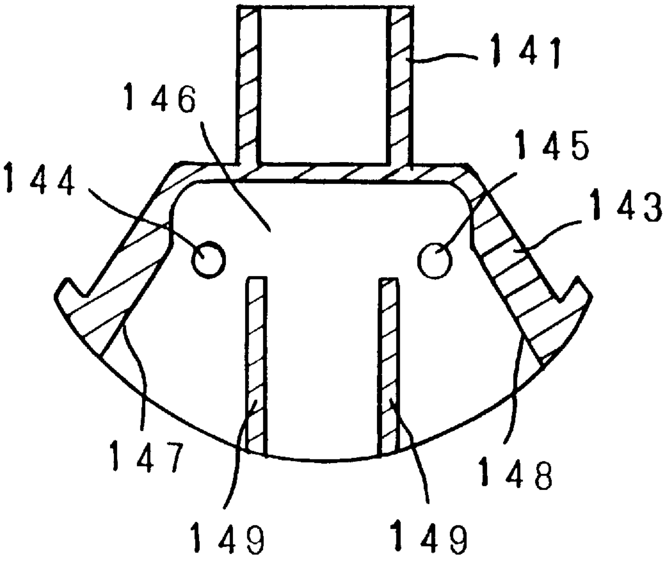
FIG. 4 is a sectional view of a three-way joint of a preferred embodiment in accordance with the present invention.
Figure 5:
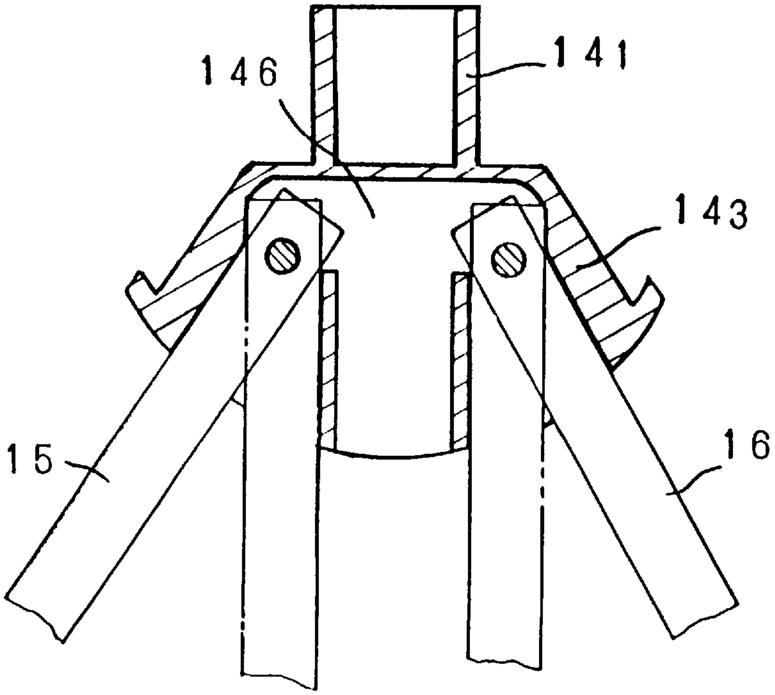
FIG. 5 is a sectional schematic view illustrating a three-way joint receiving a first support rod and a second support rod of a preferred embodiment in accordance with the present invention.
Figure 6:
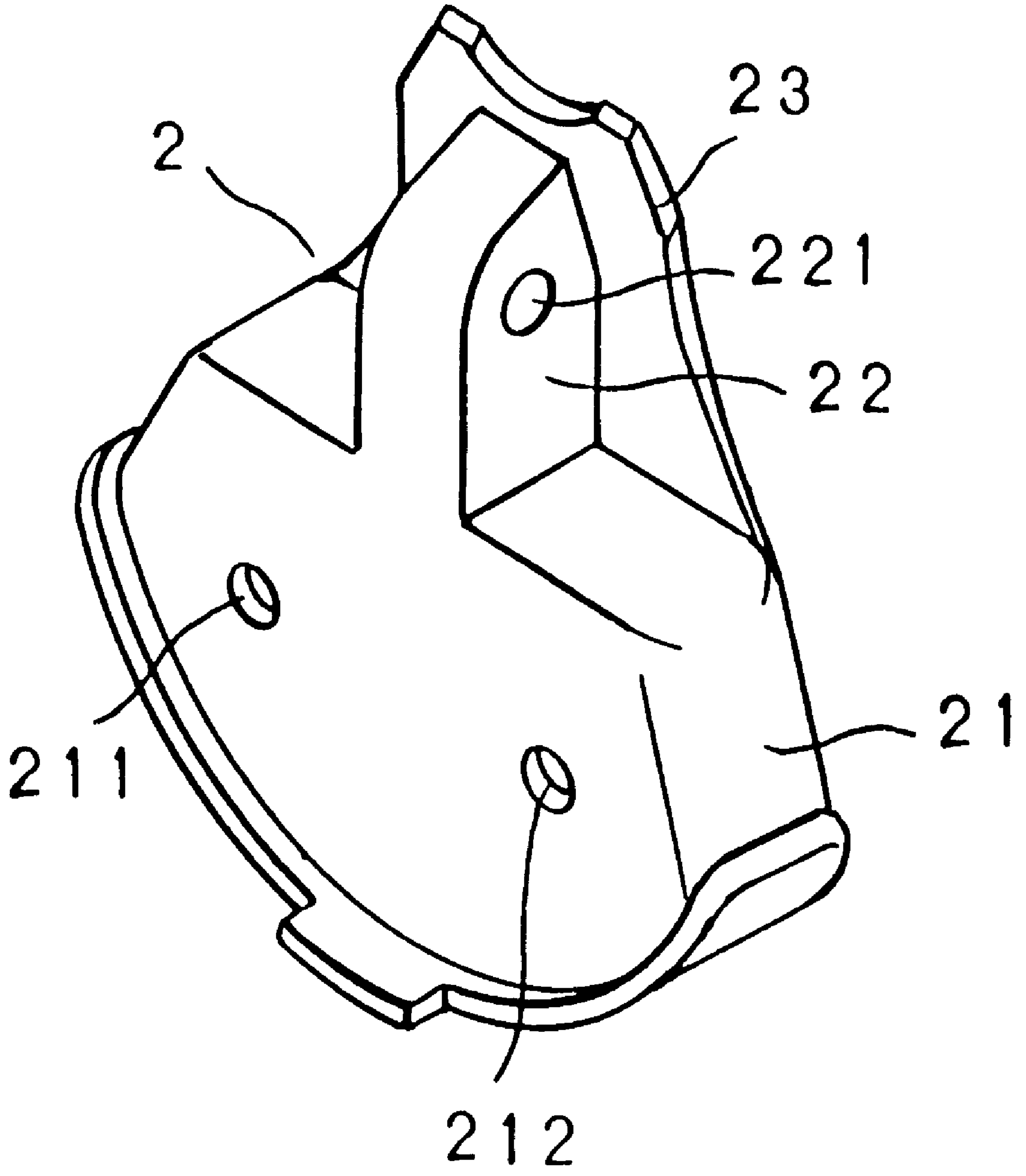
FIG. 6 is a perspective view of an adjustment seat of a preferred embodiment in accordance with the present invention.
Figure 7:
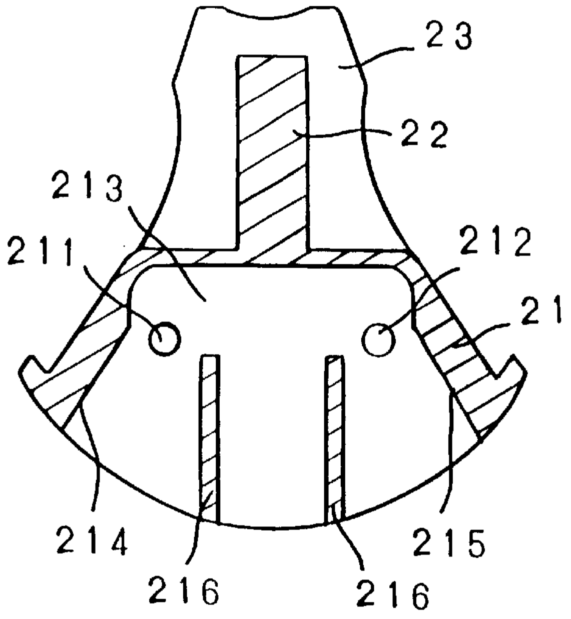
FIG. 7 is a sectional view of an adjustment seat of a preferred embodiment in accordance with the present invention.
Figure 8:
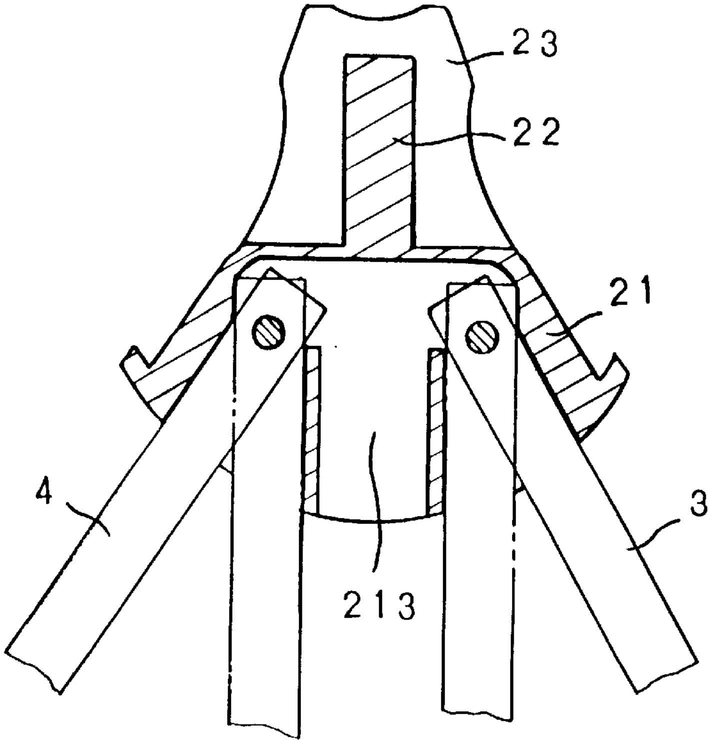
FIG. 8 is a sectional schematic view illustrating an adjustment seat receiving a first hollow leg and a second hollow leg of a preferred embodiment in accordance with the present invention.
Figure 9:
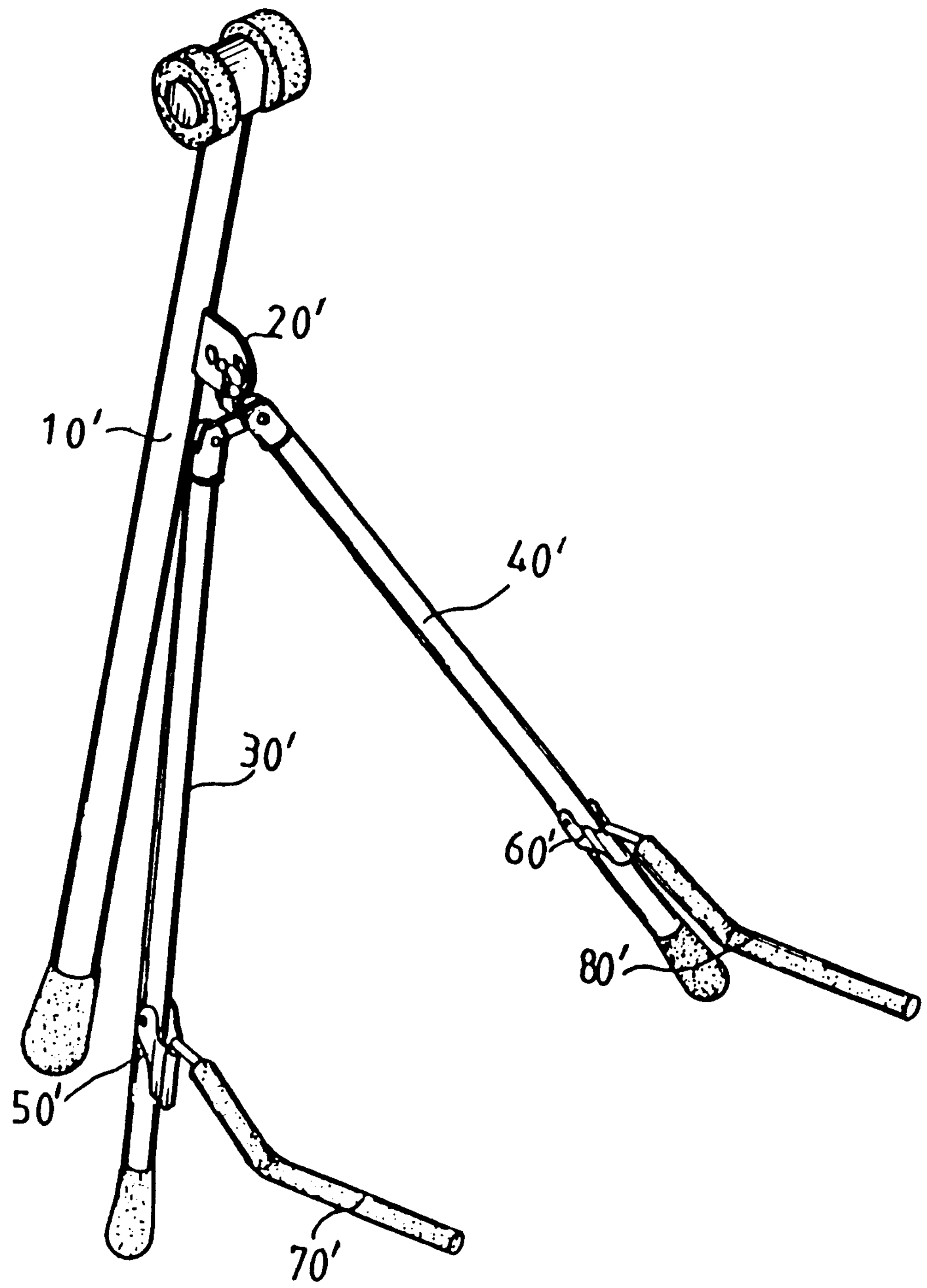
FIG. 9 PRIOR ART
FIG. 9 is a perspective assembly view of a guitar stand of the prior art.
Figure 10:
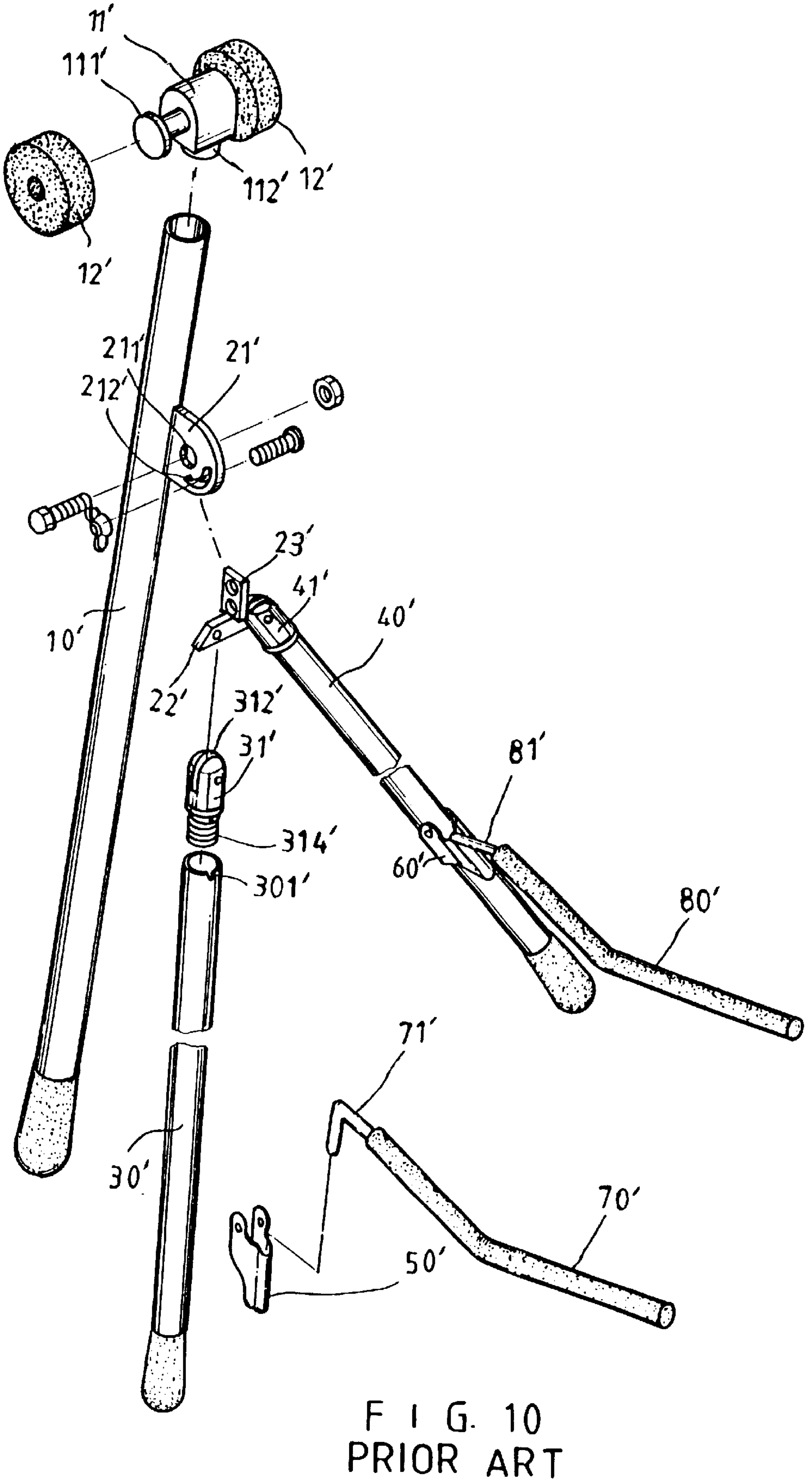
F I G. 10 PRIOR ART
FIG. 10 is a perspective exploded view of a guitar stand of the prior art.

Referring to FIGS. 1 to 8, a guitar stand comprises a main support frame 1, a first hollow leg 3, a second hollow leg 4, a first bracket 5, a second bracket 6, an adjustment seat 2, and a head block 11.

The first bracket 5 has a connector 51 disposed on the first hollow leg 3.

The second bracket 6 has a connecting brace 61 disposed on the second hollow leg 4.

The head block 11 has a pair of side pillars 110 to receive a pair of cushions 12, a lower tube 111 and a pair of lugs 112 disposed on a lower portion of the lower tube 111.

Each of the lugs 112 has a threaded aperture 113.

The main support frame 1 has a main hollow rod 10, a three-way joint 14, a first support rod 15, and a second support rod 16.

The three-way joint 14 has an upper tube 141 to receive the main hollow rod 10 and a hollow socket 143 connected to the upper tube 141.

The hollow socket 143 has a first through hole 144, a second through hole 145, a recess chamber 146 having a first slant wall 147 and a second slant wall 148, and a pair of lower blocking bars 149.

The recess chamber 146 receives the first support rod 15 and the second support rod 16.

The lower blocking bars 149 block and separate the first support rod 15 and the second support rod 16.

The adjustment seat 2 has a hollow receptacle 21, a rib 22 extending upward from the hollow receptacle 21, and a positioning panel 23 disposed on the rib 22 and the hollow receptacle 21.

The hollow receptacle 21 has a first through aperture 212, a second through aperture 211, a blind chamber 213 having a first inner bevel 214 and a second inner bevel 215, and a pair of lower blocking plates 216.

The blind chamber 213 receives the first hollow leg 3 and the second hollow leg 4.

The lower blocking plates 216 block and separate the first hollow leg 3 and the second hollow leg 4.

The rib 22 has a threaded hole 221.

The rib 22 is disposed between the lugs 112.

A bolt 13 fastens the rib 22 between the lugs 112.

The upper tube 141 has an inner protrusion 142 and the main hollow rod 10 has a lower groove 101 to receive the inner protrusion 142 of the upper tube 141.

The first support rod 15 has a round aperture 151 to match the first through hole 144 of the hollow socket 143.

The second support rod 16 has a circular aperture 161 to match the second through hole 145 of the hollow socket 143.

A plurality of rivets 17 fasten the first support rod 15 and the second support rod 16 on the hollow socket 143.

The first hollow leg 3 has a circular hole 31 to match the first through aperture 212 of the hollow receptacle 21.

The second hollow leg 4 has a first round hole 41 to match the second through aperture 211 of the hollow receptacle 21 and a second round hole 42.

A plurality of rivets 24 fasten the first hollow leg 3 and the second hollow leg 4 on the hollow receptacle 21.

The present invention is not limited to the above embodiment but various modification thereof may be made. Furthermore, various changes in form and detail may be made without departing from the scope of the present invention.

I claim:

1. A guitar stand comprises:

a main support frame, a first hollow leg, a second hollow leg, a first bracket, a second bracket, an adjustment seat, and a head block, the first bracket having a connector disposed on the first hollow leg, the second bracket having a connecting brace disposed on the second hollow leg, the head block having a pair of side pillars to receive a pair of cushions, a lower tube and a pair of lugs disposed on a lower portion of the lower tube, each of the lugs having a threaded aperture, the main support frame having a main hollow rod, a three-way joint, a first support rod, and a second support rod, the three-way joint having an upper tube to receive the main hollow rod and a hollow socket connected to the upper tube, the hollow socket having a first through hole, a second through hole, a recess chamber having a first slant wall and a second slant wall, and a pair of lower blocking bars, the recess chamber receiving the first support rod and the second support rod, the lower blocking bars blocking and separating the first support rod and the second support rod, the adjustment seat having a hollow receptacle, a rib extending upward from the hollow receptacle, and a positioning panel disposed on the rib and the hollow receptacle, the hollow receptacle having a first through aperture, a second through aperture, a blind chamber having a first inner bevel and a second inner bevel, and a pair of lower blocking plates, the blind chamber receiving the first hollow leg and the second hollow leg, the lower blocking plates blocking and separating the first hollow leg and the second hollow leg, the rib having a threaded hole, and a bolt fastening the rib between the lugs.

2. The guitar stand as claimed in claim 1, wherein the upper tube has an inner protrusion and the main hollow rod has a lower groove to receive the inner protrusion of the upper tube.

3. The guitar stand as claimed in claim 1, wherein the first support rod has a round aperture to match the first through hole of the hollow socket and the second support rod has a circular aperture to match the second through hole of the hollow socket.

4. The guitar stand as claimed in claim 1, wherein the first hollow leg has a circular hole to match the first through aperture of the hollow receptacle and the second hollow leg has a first round hole to match the second through aperture of the hollow receptacle.

* * * * *